United States Patent
Yamada et al.

(10) Patent No.: US 12,472,624 B2
(45) Date of Patent: Nov. 18, 2025

(54) SPRING CONSTANT CORRECTION DEVICE, METHOD THEREFOR, AND RECORDING MEDIUM

(71) Applicant: Kobe Steel, Ltd., Kobe (JP)

(72) Inventors: Takashi Yamada, Kobe (JP); Yoshiharu Nishida, Kobe (JP); Yoshihisa Tamase, Kakogawa (JP); Naoki Kida, Fujisawa (JP); Kenichiro Kanao, Fujisawa (JP)

(73) Assignee: Kobe Steel, Ltd., Kobe (JP)

( * ) Notice: Subject to any disclaimer, the term of this patent is extended or adjusted under 35 U.S.C. 154(b) by 150 days.

(21) Appl. No.: 18/261,010

(22) PCT Filed: Jan. 13, 2022

(86) PCT No.: PCT/JP2022/000958
§ 371 (c)(1),
(2) Date: Jul. 11, 2023

(87) PCT Pub. No.: WO2022/176456
PCT Pub. Date: Aug. 25, 2022

(65) Prior Publication Data
US 2024/0083024 A1 Mar. 14, 2024

(30) Foreign Application Priority Data
Feb. 19, 2021 (JP) .................... 2021-024925

(51) Int. Cl.
*B25J 9/16* (2006.01)
*B25J 13/08* (2006.01)

(52) U.S. Cl.
CPC ........... *B25J 9/1633* (2013.01); *B25J 9/1664* (2013.01); *B25J 13/088* (2013.01)

(58) Field of Classification Search
None
See application file for complete search history.

(56) References Cited

U.S. PATENT DOCUMENTS 11,850,751 B2 * 12/2023 Matsuda ................ B25J 9/1628
2002/0173878 A1 * 11/2002 Watanabe .............. B25J 9/1638
700/247

(Continued)

FOREIGN PATENT DOCUMENTS

JP 7-60667 A 3/1995
JP 2006059037 A * 3/2006

(Continued)

OTHER PUBLICATIONS

International Preliminary Report on Patentability and Written Opinion issued Aug. 31, 2023, in PCT/JP2022/000958, 6 pages.

(Continued)

*Primary Examiner* — Khoi H Tran
*Assistant Examiner* — Dairon Estevez
(74) *Attorney, Agent, or Firm* — Oblon, McClelland, Maier & Neustadt, L.L.P.

(57) ABSTRACT

A spring constant correction device and method measure a position and attitude of a distal end of an articulated robot when the articulated robot is operated in a state where elastic deformation is compensated, compare measurement values of the position and attitude of the distal end and target values of the position and attitude, and correct a spring constant based on a result of the comparison. In case of the correction, the spring constant is corrected at a predetermined position based on at least three of: an angle of an end point attitude based on the measured attitude; a torque of the distal end in the end point attitude; an angle of the distal end in a target attitude; and a torque of the distal end in the target attitude. A program of such a method is recorded in a recording medium.

12 Claims, 7 Drawing Sheets

(56) References Cited

U.S. PATENT DOCUMENTS

| | | | | |
|---|---|---|---|---|
| 2013/0234642 A1* | 9/2013 | Igarashi | ............... | H02P 23/0004 |
| | | | | 318/611 |
| 2015/0105905 A1* | 4/2015 | Nishida | ................ | B23K 9/0216 |
| | | | | 700/254 |

FOREIGN PATENT DOCUMENTS

| JP | 2010058256 A | * | 3/2010 |
|---|---|---|---|
| JP | 2011125955 A | * | 6/2011 |
| JP | 2014180726 A | * | 9/2014 |

OTHER PUBLICATIONS

International Search Report mailed on Mar. 29, 2022 in PCT/JP2022/000958 filed on Jan. 13, 2022, 2 pages).

* cited by examiner

SPRING CONSTANT CORRECTION DEVICE, METHOD THEREFOR, AND RECORDING MEDIUM

TECHNICAL FIELD

The present invention relates to a spring constant correction device and a spring constant correction method that are applied to an articulated robot in which a speed reducer acts as a spring element and elastically deforms and that correct a spring constant of the spring element. The present invention relates to a recording medium in which a spring constant correction program is recorded.

BACKGROUND ART

When welding a plurality of base materials by arc welding, weaving welding is often used in which welding is performed while performing a sine-wave weaving motion in the lateral direction with respect to a welding line while advancing a welding electrode in a welding direction. The weaving welding is generally performed by swinging the welding torch itself in the lateral direction or by tilting the welding torch itself in the lateral direction. When an articulated robot is made to perform such weaving welding, high trajectory accuracy is required. For example, a spring constant correction device for an articulated robot disclosed in Patent Literature 1 is used to achieve high trajectory accuracy in consideration of elastic deformation of a speed reducer in a power transmission system of a robot.

A spring constant correction device for an articulated robot disclosed in Patent Literature 1 is a spring constant correction device that is applied to an articulated robot in which a speed reducer acts as a spring element and elastically deforms, the articulated robot being operated in a state where elastic deformation is compensated based on a spring constant of the spring element by an elastic deformation compensation unit included in a robot controller, the spring constant correction device including: a comparison unit that compares measurement values of a position and attitude, of a distal end of the articulated robot, measured by a sensor when the articulated robot is operated in a state where the elastic deformation is compensated and target values of the position and attitude of the distal end of the articulated robot; and a correction unit that corrects the spring constant using a result obtained by comparison by the comparison unit, wherein the correction unit converts errors of the position and attitude of the distal end, the errors being a result of the comparison by the comparison unit, into a robot joint angle error, and the correction unit calculates an estimated torque at a weaving distal end position using a model of the articulated robot, and the correction unit calculates a spring constant error based on the relationship between the robot joint angle error and the estimated torque, and corrects the spring constant using the calculated spring constant error.

Meanwhile, in the spring constant correction device for an articulated robot disclosed in Patent Literature 1, the correction accuracy starts to decrease as the difference between the arm torque at the end point position of the weaving motion and the torque required at a target end point position of the weaving motion increases, therefore, there is room for improvement.

CITATION LIST

Patent Literature

Patent Literature 1: JP 6091272 B2 (JP 2014-180726 A)

SUMMARY OF INVENTION

The present invention has been made in view of the above circumstances, and an object of the present invention is to provide a spring constant correction device and a spring constant correction method capable of further improving correction accuracy. Another object of the present invention is to provide a recording medium recording a spring constant correction program.

A spring constant correction device and a spring constant correction method according to the present invention measure a position and attitude of a distal end of an articulated robot when the articulated robot is operated in a state where elastic deformation is compensated, compare measurement values of the position and attitude of the distal end of the articulated robot and target values of the position and attitude of the distal end of the articulated robot, and correct a spring constant based on a result of the comparison. At the time of the correction, the spring constant is corrected at a predetermined position based on at least three of: an angle of an end point attitude based on the measured attitude of the distal end of the articulated robot; a torque of the distal end of the articulated robot in the end point attitude; an angle of the distal end of the articulated robot in a target attitude; and a torque of the distal end of the articulated robot in the target attitude. In the recording medium according to the present invention, a program of such a spring constant correction method is recorded.

The above and other objects, features and advantages of the present invention will be apparent from the following detailed description and accompanying drawings.

DESCRIPTION OF EMBODIMENTS

Figure 1:
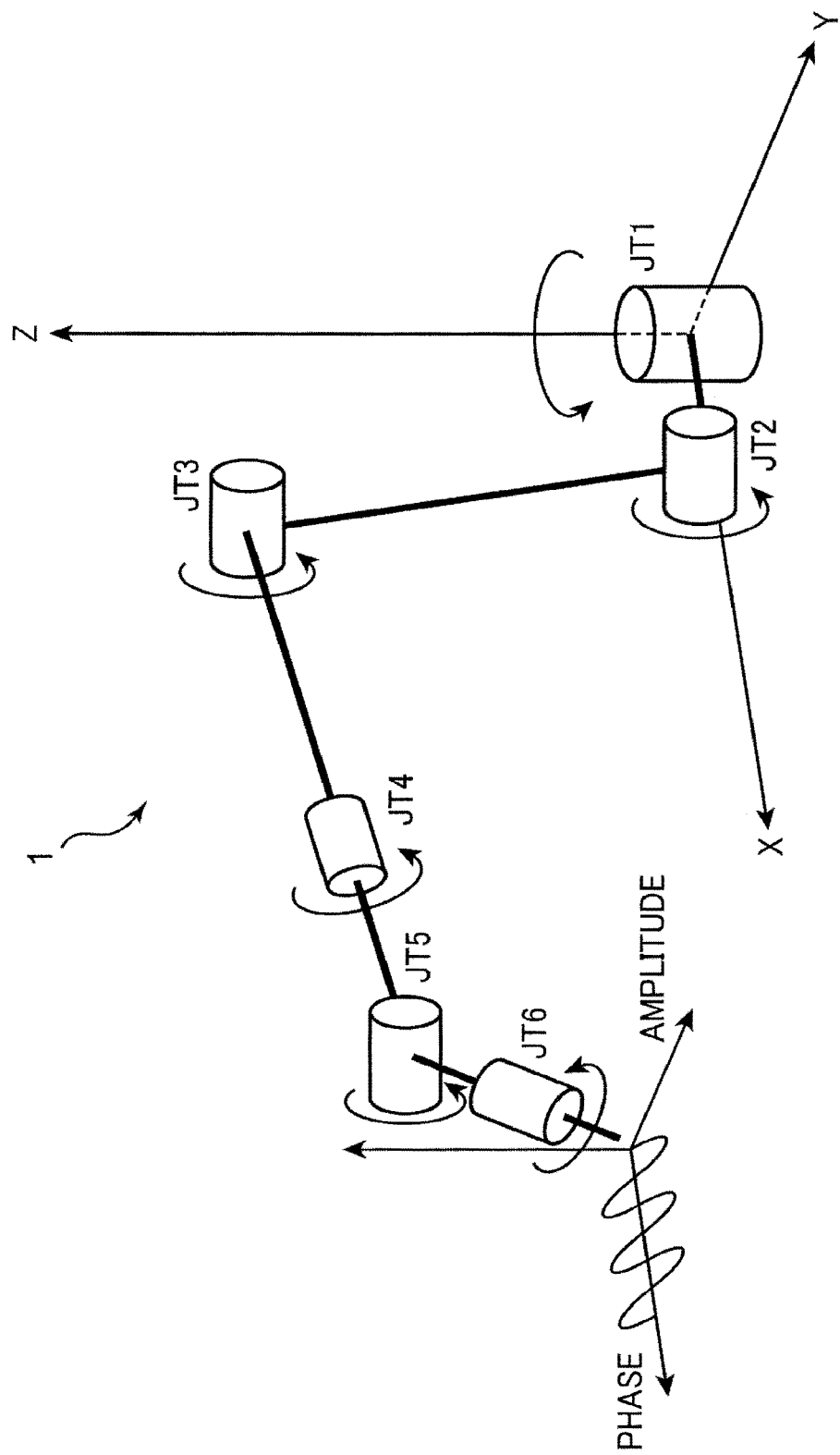
FIG. 1 is a schematic diagram illustrating a configuration of an articulated robot to which a spring constant correction device according to an embodiment is applied.

Hereinafter, one or a plurality of embodiments of the present invention will be described with reference to the drawings. However, the scope of the invention is not limited to the disclosed embodiments. Note that in the drawings, the same reference signs denote the same components, and description thereof will be appropriately omitted. In the present specification, when components are collectively referred to, the components will be denoted by reference signs with suffixes omitted, and when components are individually referred to, the components will be denoted by reference signs with suffixes.

A spring constant correction device according to the present embodiment is applied to an articulated robot in which a speed reducer acts as a spring element and elastically deforms, and the spring constant correction device corrects a spring constant of the spring element. The articulated robot is operated in a state where elastic deformation is compensated based on the spring constant of the spring element by an elastic deformation compensation unit included in a robot controller. For such an articulated robot, the spring constant correction device includes: a measurement unit that measures a position and attitude of a distal end of the articulated robot when the articulated robot is operated in a state where elastic deformation is compensated; a comparison unit that compares measurement values of the position and attitude, of the distal end of the articulated robot, measured by the measurement unit and target values of the position and attitude of the distal end of the articulated robot; and a correction unit that corrects the spring constant based on a result obtained by comparison by the comparison unit. Then, the correction unit corrects, at a predetermined position, the spring constant based on at least three of: an angle of an end point attitude based on the attitude, of the distal end of the articulated robot, measured by the measurement unit; a torque of the distal end of the articulated robot in the end point attitude; an angle of the distal end of the articulated robot in a target attitude; and a torque of the distal end of the articulated robot in the target attitude. Hereinafter, such a spring constant correction device, and a spring constant correction method and a spring constant correction program that are mounted on the spring constant correction device will be described more specifically.

Figure 2:
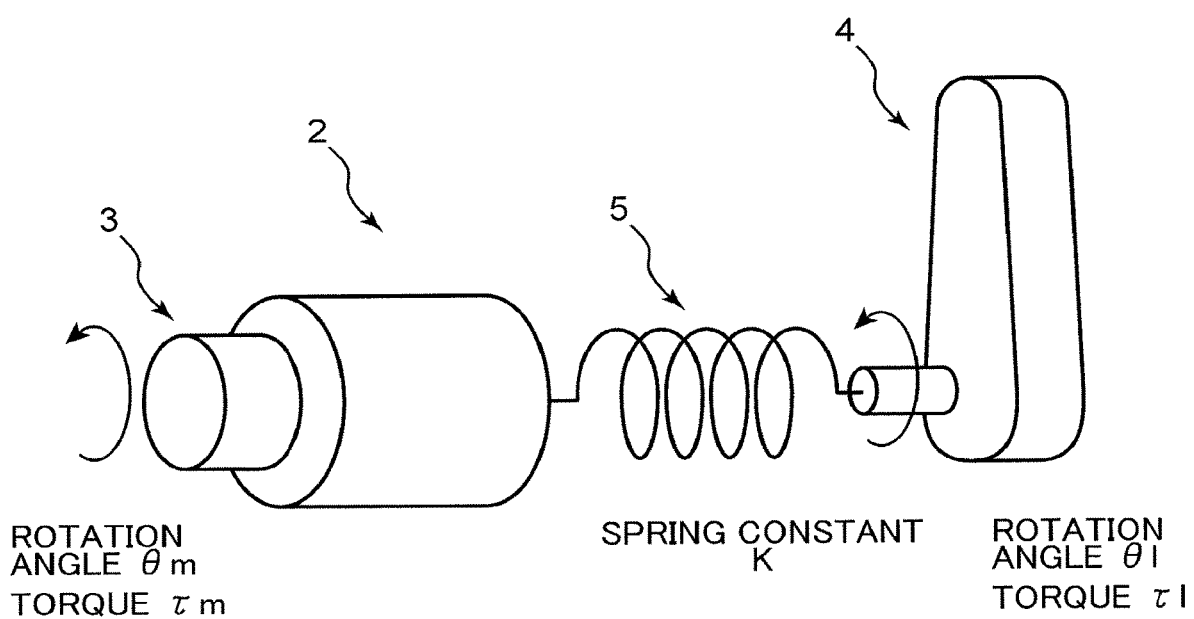
FIG. 2 is a schematic diagram illustrating a model of one joint axis in the articulated robot.
Figure 3:
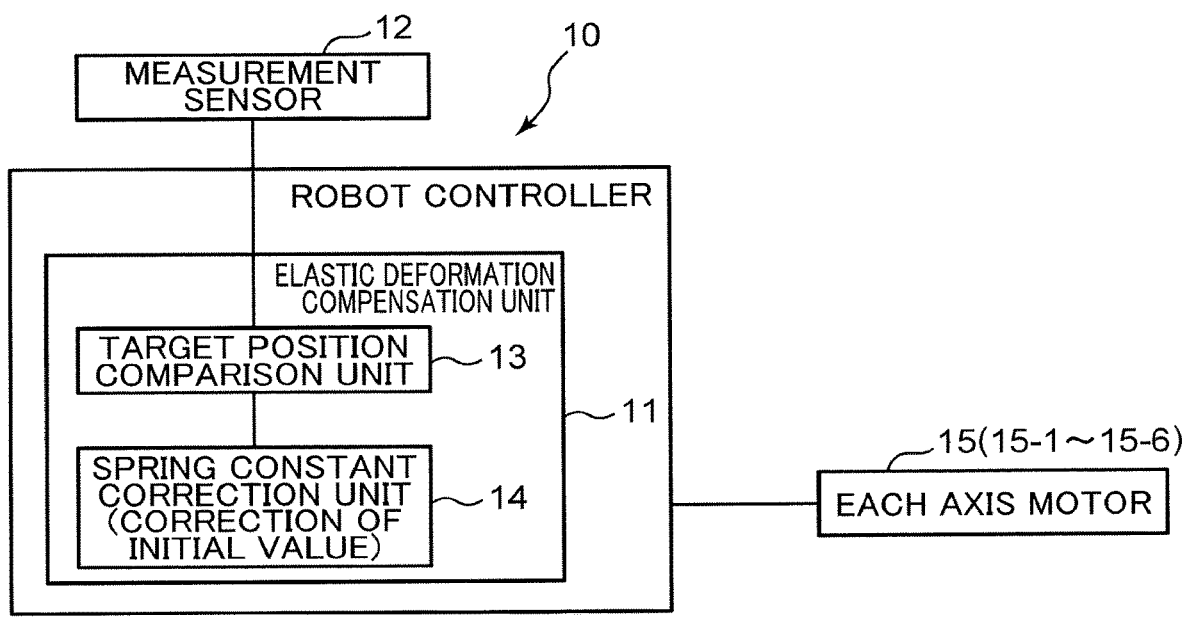
FIG. 3 is a block diagram illustrating a configuration of a control device, of the articulated robot, including the spring constant correction device.

FIG. 1 is a schematic diagram illustrating a configuration of an articulated robot to which a spring constant correction device according to an embodiment is applied. FIG. 2 is a schematic diagram illustrating a model of one joint axis in the articulated robot. FIG. 3 is a block diagram illustrating a configuration of a control device, of the articulated robot, including the spring constant correction device.

Overall Configuration

An articulated robot 1 to which the spring constant correction device in the embodiment is applied is of a so-called vertical articulated type, and is a six-axis robot having six degrees of freedom and including six joints, i.e., first to sixth joints JT1 to JT6. Each of the first to sixth joints JT1 to JT6 includes an actuator so as to function as a joint. In the present embodiment, the actuators are, for example, motors 15 (15-1 to 15-6). A welding torch as an example of a tool is provided at a tip of an axis of the sixth joint JT6, and the articulated robot 1 can weld by arc welding with a welding wire fed out from the welding torch. A welding work section is between a predetermined welding start point and welding end point, and the articulated robot 1 is set to perform an operation (weaving motion) of tilting the welding wire at a predetermined amplitude and frequency while moving in a welding line direction connecting the welding start point and the welding end point. In the present embodiment, the articulated robot to which the spring constant correction device is applied is a welding robot, but is not limited thereto. For example, at the tip of the axis of the sixth joint JT6 there may be provided an appropriate tool, instead of the welding torch, in accordance with an application of the articulated robot 1.

One joint axis of the articulated robot 1 can be modeled as illustrated in FIG. 2. More specifically, a model representing one joint axis includes: a motor 2, an encoder 3 that is provided on the motor 2 and is an example of an angle measurement unit to measure a rotation angle of the motor 2; an arm 4 that is rotated by the motor 2; and a speed reducer 5 connecting the motor 2 and the arm 4. Because the speed reducer 5 can be modeled as a spring element (elastic element), a torque $\tau l$ on the arm 4 side is expressed by $\tau l = K \cdot (\theta l - \theta m)$, where a spring constant is K, a rotation angle on the motor 2 side is $\theta m$, and a rotation angle on the arm 4 side is $\theta l$.

Control Device; Robot Controller as Example Thereof

The articulated robot 1 is controlled by a robot controller 10 that is an example of a control device thereof. As illustrated in FIG. 3, to the robot controller 10 there are connected a measurement sensor 12 and motors 15 (15-1 to 15-6) of respective ones of the axes of the first to sixth joints JT1 to JT6 in the articulated robot 1. The measurement sensor 12 is a sensor that measures the position and attitude of the distal end of the articulated robot 1. Because the articulated robot 1 is operated in a state where elastic deformation is compensated as described later, the measurement sensor 12 measures the position and attitude of the distal end of the articulated robot 1 when the articulated robot 1 is operated in a state where the elastic deformation is compensated. The measurement sensor 12 outputs a measurement result by the measurement sensor 12 to the robot controller 10. The motor 15 of the axis of each of the first to sixth joints JT1 to JT6 in the articulated robot 1 is controlled (for example, servo control or the like) by the robot controller 10. Because a known common practice is used for this control, a control block for this control is not described in detail in FIG. 3.

The robot controller 10 includes, for example, a computer and a so-called teaching pendant. The computer includes, for example: an input device; an output device; a memory; an interface device; a central processing unit (CPU) that controls these devices to perform predetermined information processing; and peripheral circuits for these devices and the CPU. The robot controller 10 stores in the memory various predetermined programs and various predetermined data necessary for operating the articulated robot 1. The various predetermined programs include, for example, a control processing program, and the control processing program includes, for example: a control program for controlling the measurement sensor 12 to acquire a measurement result and for servo-controlling each of the motors 15 of the axes; an elastic deformation compensation program for causing the articulated robot 1 to operate in a state where elastic deformation is compensated based on a spring constant K of the spring element; a target position comparison program for comparing measurement values of the position and attitude, of the distal end of the articulated robot 1, measured by the measurement sensor 12 and target values of the position and attitude of the distal end of the articulated robot 1; and a spring constant correction program for correcting the spring constant based on a result obtained by comparison by the comparison program. The various predetermined data includes, for example, a spring constant K, an initial value of the spring constant K, and a teaching program. In one example, such predetermined programs and the predetermined data may be read by the computer from a recording medium (for example, a universal serial bus (USB) memory or a compact disc read only memory (CD-ROM)) in which the predetermined program and the predetermined data are recorded, and be stored in the memory.

In the robot controller 10, the following units are functionally configured by execution of the control program: an elastic deformation compensation unit 11, a target position comparison unit 13, and a spring constant correction unit 14. The robot controller 10 controls the articulated robot 1 such that a welding torch provided on the articulated robot 1 moves following a welding line according to a previously-taught teaching program, while weaving. The teaching program may be created in advance using, for example, the teaching pendant connected to the robot controller 10, or may be created in advance using an offline teaching system using the host computer.

The spring constant correction device according to the embodiment is implemented by the robot controller 10. Note that the spring constant correction device is implemented by the robot controller 10 in the present embodiment, but the present invention is not limited thereto. For example, the spring constant correction device may be implemented by a host computer connected to the robot controller 10.

The elastic deformation compensation unit 11 includes: the target position comparison unit 13 that compares measurement values of the position and attitude, of the distal end of the articulated robot 1 (the tip of the welding torch in the present embodiment) in, for example, an XY plane coordinate system, measured by the measurement sensor 12 and target values of the position and attitude; and the spring constant correction unit 14 that corrects a spring constant K (the spring constant of the modeled speed reducer 5 in the present embodiment) based on a result obtained by comparison by the target position comparison unit 13. The robot controller 10 controls each motor 15 (15-1 to 15-6) of each axis in the articulated robot 1 while the elastic deformation compensation unit 11 compensates elastic deformation using the spring constant K corrected by the spring constant correction unit 14.

Weaving Inspection Process and Spring Constant Correction Process

Figure 4:
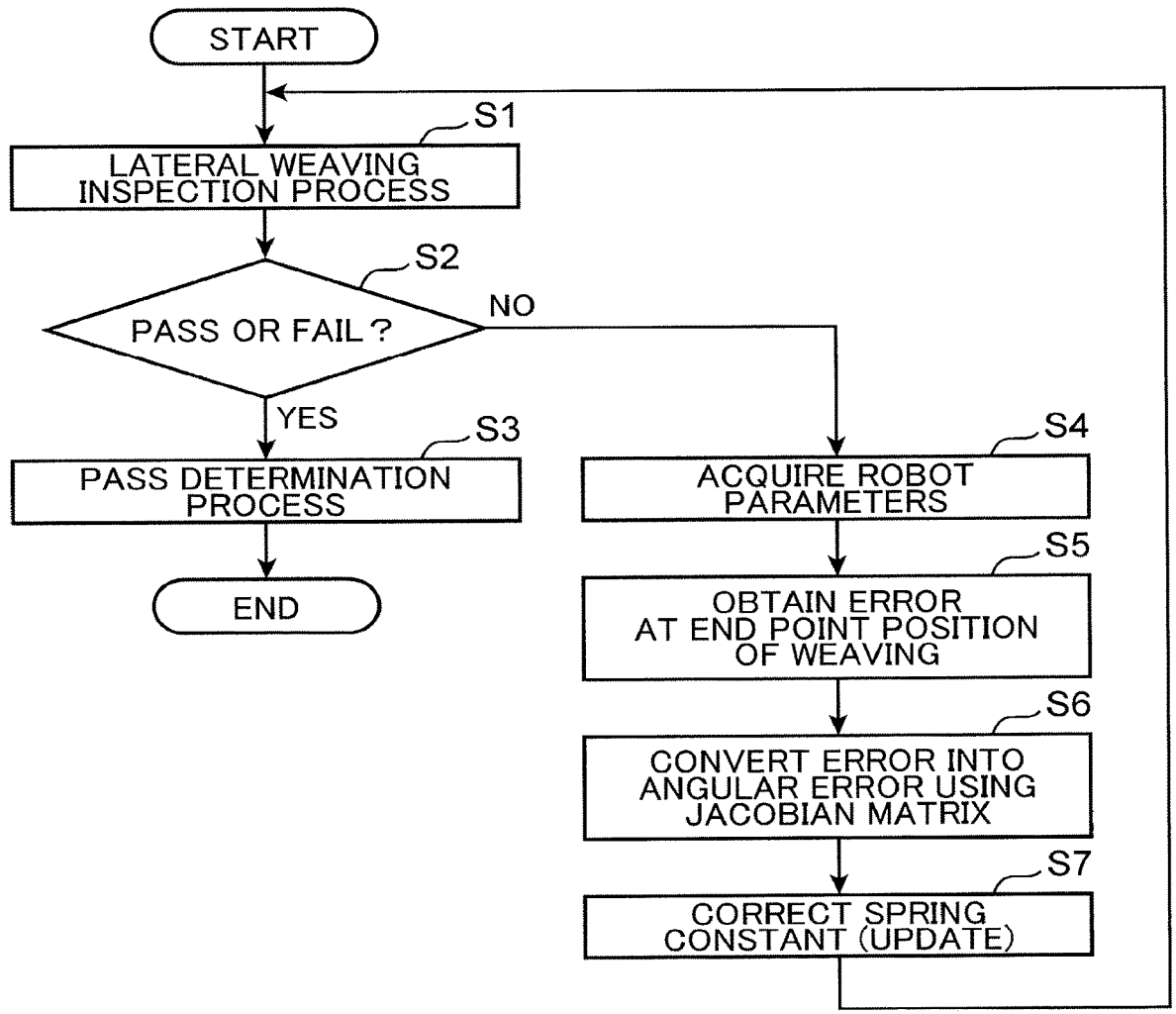
FIG. 4 is a flowchart illustrating a weaving inspection process of the articulated robot and a spring constant correction process performed by the spring constant correction device.
Figure 5:
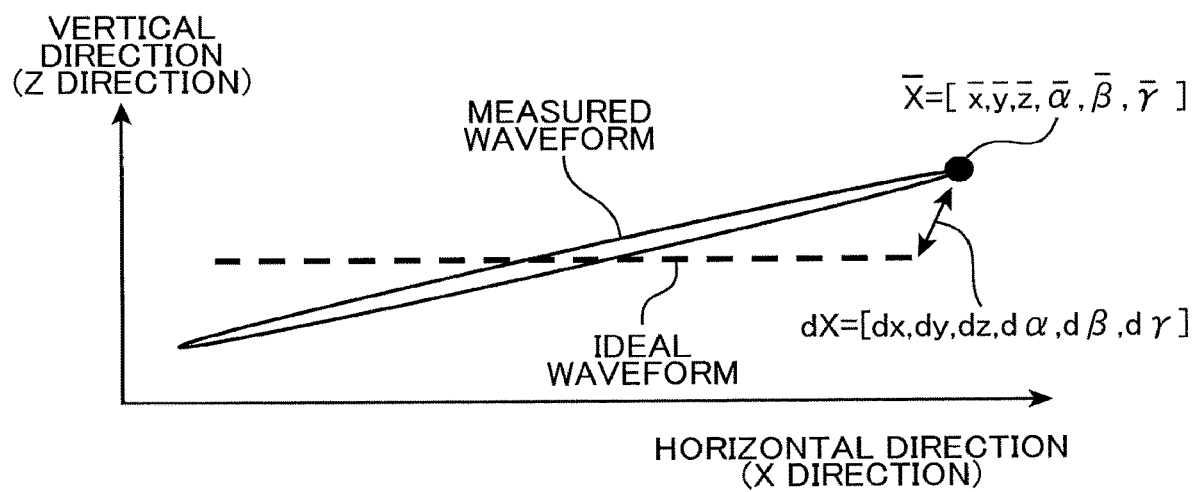
FIG. 5 is a diagram for describing a process S5 of the flowchart shown in FIG. 4.
Figure 6:
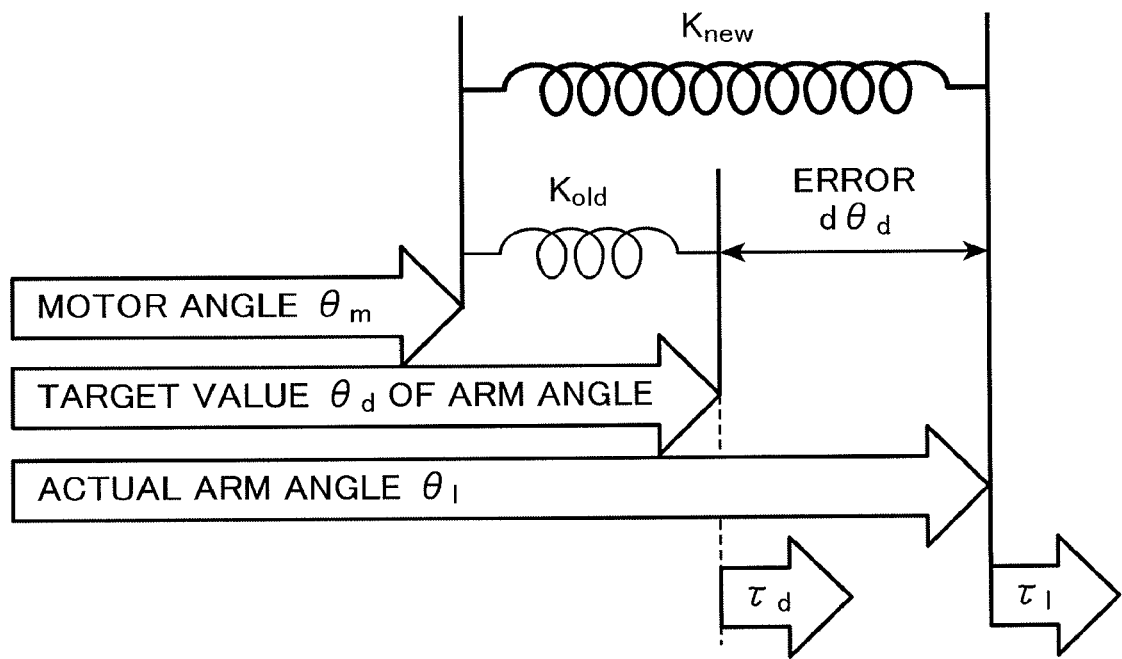
FIG. 6 is a diagram for describing a relationship between a motor angle at an end point of a weaving motion, an actual arm angle, a target arm angle, an actual arm torque, and a torque required at the target arm angle.

FIG. 4 is a flowchart illustrating a weaving inspection process of the articulated robot and a spring constant correction process performed by the spring constant correction device. FIG. 5 is a diagram for describing a process S5 of the flowchart illustrated in FIG. 4. FIG. 6 is a diagram for describing a relationship between a motor angle at an end point of a weaving motion, an actual arm angle, a target arm angle, an actual arm torque, and a torque required by the target arm angle.

With respect to the articulated robot 1 whose operation is controlled by such a robot controller 10, a shipping inspection is performed, for example, before product shipping after manufacturing. One of the shipping inspections is a lateral weaving inspection. In the lateral weaving inspection, the spring constant K of the speed reducer 5 is corrected from the initial value.

In this lateral weaving inspection, in FIG. 4, the elastic deformation compensation unit 11 performs a lateral weaving inspection process (step S1). For example, the robot controller 10 is set to an inspection mode, a servo control is manually performed, and an arm tip of the articulated robot 1 is weaved laterally. In this case, as shown in FIG. 5, coordinate data, for example, in the vertical direction (Z direction) and the horizontal direction (X direction) of a weaving distal end position are acquired and stored. Note that one of the six axes will be described here.

Next, the elastic deformation compensation unit 11 determines pass or fail (step S2). For example, in a case where a deviation (difference between a target value and a measurement value) is less than or equal to a predetermined threshold (pass-or-fail determination threshold), the elastic deformation compensation unit 11 determines as "pass", and in a case where the deviation exceeds the pass determination threshold, the elastic deformation compensation unit 11 does not determine as "pass" (that is, "fail"). As a result of the determination, in the case of "pass" (YES), the elastic deformation compensation unit 11 next performs a process S3. On the other hand, in the case of "fail" (NO), the elastic deformation compensation unit 11 next performs a process S4 in order to perform the spring constant correction process.

In the process S3, the elastic deformation compensation unit 11 performs a pass determination process. In the pass determination process, for example, the spring constant K is established and stored in a memory, the robot controller 10 is shifted from the inspection mode to a normal mode.

In the process S4, the elastic deformation compensation unit 11 acquires various robot parameters of the articulated robot 1. For example, an inertia term J, a non-linear term C, a gravity term G, and the spring constant K before correction for each axis of the articulated robot 1 stored in the robot controller 10 or the host computer of the robot controller are acquired. Since the spring constant K is overwritten in each process of repetitive processing, the spring constant K calculated and stored by the previous spring constant correction process or the initial value of the spring constant K is acquired, in process S4.

Next, the elastic deformation compensation unit 11 obtains an error at the end point position of the weaving motion, using the target position comparison unit 13 (step S5). As illustrated in FIG. 5, a difference between the ideal waveform at the position of the distal end of the articulated robot 1 represented by the dotted line and the measured waveform that is measured by the measurement sensor 12 is obtained as the error. With respect to the ideal waveform, the value at each point in the vertical direction is a predetermined constant value. The measured waveform $\overline{X}$ is expressed by the following Expression 1, and the error dX is expressed by the following Expression 2. Note that because "—" cannot be added immediately above "X" in the description in the sentences, "X" to which "—" is added immediately above is described as "X—" for convenience. The same applies to "^", "·", and "··" immediately above described later.

[Mathematical Expression 1]

$$\overline{X} = [\overline{x}, \overline{y}, \overline{z}, \overline{\alpha}, \overline{\beta}, \overline{\gamma}] \qquad \text{Expression 1:}$$

[Mathematical Expression 2]

$$dX = [dx, dy, dz, d\alpha, d\beta, d\gamma] \qquad \text{Expression 2:}$$

In Expression 2, x, y, and z represent the coordinate of the position of the arm tip of the articulated robot 1, and α, β, and γ represent attitude angles (Euler angles or roll, pitch, and yaw angles) of the arm tip.

Here, it is preferable that all of these six degrees of freedom (x, y, z, α, β, γ) can be measured, but the following case may be acceptable. At least two degrees of freedom x, y, z, α, β, and γ (for example, in the case of lateral weaving, two degrees of freedom in the horizontal direction and the vertical direction, which are main operation directions) out of the six degrees of freedom are measured, dα, dβ, and dγ are assumed to be 0, and dx or dy may be assumed to be 0. As a result, even in a case where there are two sensors for measuring the position (or attitude) of the arm tip of the articulated robot 1, the spring constant correction method in the present embodiment can be performed. Note that the spring constant correction method is not limited to such an assumption.

Next, the elastic deformation compensation unit 11 converts the error in the position into an angular error dθ of the joint JT using the Jacobian matrix as shown in the following Expression 3 (step S6).

[Mathematical Expression 3]

$$d\theta = J(\theta_0)^{-1} \cdot dX \qquad \text{Expression 3:}$$

($\theta_0$: Angle of each axis at central position of weaving)

For the correction (update) of the spring constant K, first, the errors in the position and attitude of the distal end of the articulated robot 1, which errors are the comparison result obtained by comparison by the target position comparison unit 13, is converted into an angular error dθ of the joint JT using the Jacobian matrix.

Next, the elastic deformation compensation unit 11 corrects (updates) the spring constant K by using the spring constant correction unit 14, and returns to the process S1 (step S7). More specifically, the spring constant K is corrected as follows.

With respect to the axis of one joint JT, the physical relationship among a motor angle $\theta_m$, an actual arm angle $\theta_l$, a target arm angle $\theta_d$, an actual arm torque $\tau_l$, and a torque $\tau_d$ required at the target arm angle $\theta_d$ at the end point position of the weaving motion is expressed as illustrated in FIG. 6. Each joint JT rotates, but in FIG. 6 the rotation angles are converted into linear distances by linear motion springs, for simplification. The same applies to FIG. 7 described later.

When controlling the motor 15(2), the robot controller 10 determines the motor angle $\theta_m$ at which the arm angle becomes the target arm angle $\theta_d$ based on a current spring constant $K_{old}$. The relationship among these is given by the following Expression 4.

[Mathematical Expression 4]

$$\tau_d K_{old}(\theta_d - \theta_m) \qquad \text{Expression 4:}$$

On the other hand, the torque $\neq_d$ required at the target arm angle $\theta_d$ is obtained from an equation of motion, of the articulated robot 1, shown in the following Expression 5. In the expression, $\tau_d\hat{}$ is a torque represented by a vector having the torque of each axis as a component, and $\tau_d$ is one component of $\tau_d\hat{}$. $\theta_D$, $\theta_D\dot{}$, and $\theta_D\ddot{}$ are respectively an angle, an angular velocity, and an angular acceleration of each axis in the target attitude at the end point position of the weaving motion.

[Mathematical Expression 5]

$$\hat{\tau}_d = J\ddot{\theta}_D + C(\dot{\theta}_D, \theta_D) + G(\theta_D) \qquad \text{Expression 5:}$$

$\theta_D$, $\dot{\theta}_D$, $\ddot{\theta}_D$: Angle, angular velocity, and angular acceleration of each axis in target attitude at weaving end point Assuming that the corrected (true value after update) spring constant is a corrected spring constant $K_{new}$, the current spring constant $K_{old}$ includes an error dθ with respect to the corrected spring constant $K_{new}$; therefore, an error $d\theta_d = \theta_l - \theta_d$ occurs between the actual arm angle $\theta_l$ and the target arm angle $\theta_d$. The error $d\theta_d$ is one component of the error dθ in vector. Assuming that the angle of the motor 15(2) is controlled at the motor angle $\theta_m$, the relationship among these values is given by the following Expression 6.

[Mathematical Expression 6]

$$\tau_l = K_{new}(\theta_l - \theta_m) \qquad \text{Expression 6:}$$

On the other hand, the actual arm torque $\tau_l$ is obtained from the equation of motion of the articulated robot 1 shown in the following Expression 7. In the expression, $\tau_l\hat{}$ is a torque represented by a vector having the torque of each axis as a component, and $\tau_l$ is one component of $\tau_l\hat{}$, θ—, θ—˙ and θ—¨ are respectively an angle, an angular velocity, and an angular acceleration of each axis at an end point position X— of the weaving motion.

[Mathematical Expression 7]

$$\hat{\tau}_l = \underset{\substack{\text{Inertia}\\\text{term } J}}{J\ddot{\bar{\theta}}} + \underset{\substack{\text{Non-linear}\\\text{term } C}}{C(\dot{\bar{\theta}}, \bar{\theta})} + \underset{\substack{\text{Gravity}\\\text{term } G}}{G(\bar{\theta})} \qquad \text{Expression 7}$$

$\left(\bar{\theta}, \dot{\bar{\theta}}, \ddot{\bar{\theta}}, \text{Axial angle, axial velocity, and axial}\right.$ $\left. \text{acceleration of each axis at weaving end point } \overline{X}\right)$ The following Expression 8 is obtained from Expressions 4 and 6.

[Mathematical Expression 8]

$$K_{new} = \frac{\tau_l}{(\theta_l - \theta_d) + \frac{\tau_d}{K_{old}}} = \frac{\tau_l}{d\theta_d + \frac{\tau_d}{K_{old}}} \qquad \text{Expression 8}$$

All the variables on the right side of the above Expression 8 is known or can be obtained from known data; therefore, the current spring constant $K_{old}$ can be corrected (updated) to the corrected spring constant $K_{new}$ by using Expression 8.

That is, the spring constant correction unit 14 corrects, at a predetermined position, the spring constant K based on at least three of: an angle ($\theta_l$) of an end point attitude based on the attitude, of the distal end of the articulated robot, measured by the measurement unit 12; a torque ($\tau_l$) of the distal end of the articulated robot in the end point attitude; an angle ($\theta_d$) of the distal end of the articulated robot in a target attitude; and a torque ($\tau_d$) of the distal end of the articulated robot in the target attitude. More specifically, in the present embodiment, the corrected spring constant $K_{new}$ is expressed, at the end point position of the weaving motion, by Functional Expression 8 using the torque ($\tau_l$) of the distal end of the articulated robot in the end point attitude, the angle ($\theta_d$) of the distal end of the articulated robot in the target attitude, and the torque ($\tau_d$) of the distal end of the articulated robot in the target attitude. The predetermined position is an end point position of the weaving motion in the above example, but may be another position in the weaving motion.

A correction process S7 of the spring constant K is performed using Expression 8 as described above.

Note that, the corrected spring constant $K_{new}$ is expressed by a functional expression, at the predetermined position, based on at least three of: the angle ($\theta_l$) of the end point attitude based on the attitude, of the distal end of the articulated robot 1, measured by the measurement unit 12; the torque ($\tau_l$) of the distal end of the articulated robot 1 in the end point attitude; the angle ($\theta_d$) of the distal end of the articulated robot 1 in the target attitude; and the torque ($\tau_d$) of the distal end of the articulated robot 1 in the target attitude, and the spring constant correction unit 14 may correct the spring constant using the least-squares method with respect to the functional expression. Since such a spring constant correction device uses the least-squares method, the functional expression can be customized in accordance with the articulated robot 1 to which the spring constant correction device is applied, and the spring constant can be corrected with optimum correction accuracy for the articulated robot 1.

For example, a plurality of pieces of data is collected by causing the articulated robot 1 to perform a plurality of weaving motions, and the corrected spring constant $K_{new}$ is obtained as a least-square solution by applying the plurality of pieces of collected data to Expression 8. Here, a plurality of pieces of data may be fitted to the following Expression 9 obtained by modifying Expression 8, and the corrected spring constant $K_{new}$ may be obtained as a least-square solution. As the least-squares method, a weighted least-squares method may be used.

[Mathematical Expression 9]

$$\frac{K_{new}}{\tau_l} = \frac{1}{d\theta_d + \frac{\tau_d}{K_{old}}} \qquad \text{Expression 9}$$

As described above, in the spring constant correction device in the embodiment and the spring constant correction method and the spring constant correction program that are mounted on the spring constant correction device correct, at a predetermined position (an end point position of the weaving motion in the above example), the spring constant is corrected based on at least three of: an angle ($\theta_l$) of the end point attitude based on the attitude, of the distal end of the articulated robot 1, measured by the measurement unit 12; a torque ($\tau_l$) of the distal end of the articulated robot 1 in the end point attitude; an angle ($\theta_d$) of the distal end of the articulated robot 1 in a target attitude; and a torque ($\tau_d$) of the distal end of the articulated robot 1 in the target attitude. Therefore, the spring constant can be corrected regardless of the difference between the arm torque at the end point position of the weaving motion and the torque required at the target end point position of the weaving motion. Therefore, the spring constant correction device, the spring constant correction method, and the spring constant correction program can further improve the correction accuracy.

In Patent Literature 1, a corrected spring constant $K_{new}$ is obtained by the following Expression 10 (paragraph [0032] of Patent Literature 1). It has been found recently that Expression 8 can be transformed as the following Expression 11 when Expression 8 is transformed from the viewpoint of Expression 10, and it has been found recently that Expression 10 corresponds to the case of $\tau_l = \tau_d$ in Expression 11. Therefore, the spring constant correction device for an articulated robot disclosed in Patent Literature 1 coincides with the conventional experience that the correction accuracy begins to decrease as the difference between the arm torque $\tau_l$ at the end point position of the weaving motion and the torque $\tau_d$ required at the target end point position of the weaving motion increases As described above, the spring constant correction device and the like according to the present embodiment can correct the spring constant regardless of the difference between the arm torque $\tau_l$ at the end point position of the weaving motion and the torque $\tau_d$ required at the target end point position of the weaving motion; therefore, the reduction in the correction accuracy is improved.

[Mathematical Expression 10]

$$\frac{1}{K_{new}} = \frac{1}{K_{old}} + \frac{1}{dE} \qquad \text{Expression 10}$$

$K_{new}$: Spring constant after update $K_{old}$: Spring constant before update

[Mathematical Expression 11]

$$\frac{1}{K_{new}} = \frac{d\theta_d}{\tau_l} + \frac{\tau_d}{\tau_l}\frac{1}{K_{old}} \qquad \text{Expression 11}$$

The present embodiment can provide a spring constant correction device, a spring constant correction method, and a spring constant correction program using Functional Expression 8 of one aspect.

In the above embodiment, the spring constant K is expressed, at the end point position of the weaving motion, by Functional Expression 8 (first function) using the torque ($\tau_l$) of the distal end of the articulated robot in the end point attitude, the angle ($\theta_d$) of the distal end of the articulated robot in the target attitude, and the torque ($\tau_d$) of the distal end of the articulated robot in the target attitude; however, the embodiment is not limited thereto.

For example, the spring constant K may be expressed, at the end point position of the weaving motion, by Functional Expression 15 (second functional expression) using the angle ($\theta_l$) of the end point attitude based on the attitude, of the distal end of the articulated robot, measured by the measurement unit, the angle ($\theta_d$) of the distal end of the articulated robot in the target attitude, and the torque ($\tau_d$) of the distal end of the articulated robot in the target attitude.

Alternatively, for example, the spring constant K may be expressed, at the end point position of the weaving motion, by a Functional Expression 16 (third functional expression) using the angle ($\theta_l$) of the end point attitude based on the attitude, of the distal end of the articulated robot, measured by the measurement unit 12, the torque ($\tau_l$) of the distal end of the articulated robot in the end point attitude, and the angle ($\theta_d$) of the distal end of the articulated robot in the target attitude.

Figure 7:
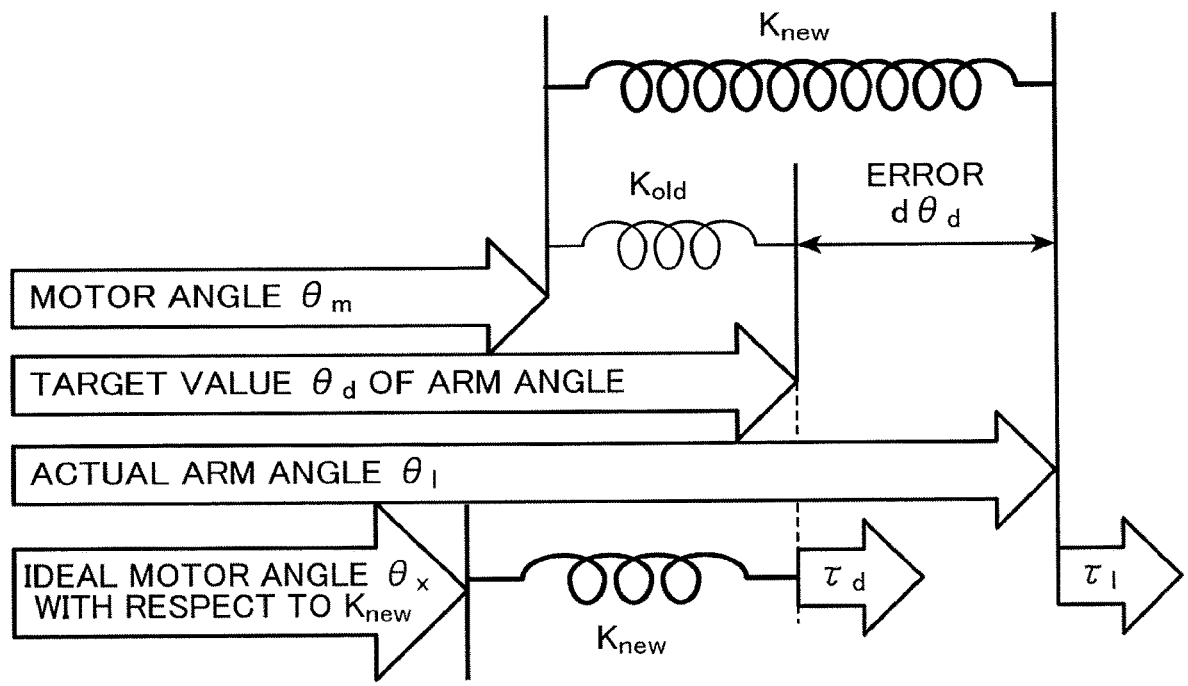
FIG. 7 is a diagram for describing a relationship, in a modification, between the motor angle at the end point of the weaving motion, the actual arm angle, the target arm angle, and the motor angle required for the arm angle to be the target arm angle in the case of a corrected spring constant.

FIG. 7 is a diagram for describing a relationship, in a modification, between the motor angle at the end point of the weaving motion, the actual arm angle, the target arm angle, and the motor angle required for the arm angle to be the target arm angle in the case of a corrected spring constant.

In the present modification, as illustrated in FIG. 7, the motor angle $\theta_X$ necessary for the arm angle to be the target arm angle $\theta_d$ will be considered, in the case of the corrected spring constant $K_{new}$. The relationship among these is given by the following Expression 12.

[Mathematical Expression 12]

$$\tau_d = K_{new}(\theta_d - \theta_X) \qquad \text{Expression 12:}$$

Here, when the motor 15(2) and the arm (4) are connected with a linear spring, the ratio between an amplitude of the motor angle and an amplitude of the arm angle depends only on a vibration frequency (weaving frequency). Therefore, the following Expression 13 is established for operation at the same frequency.

[Mathematical Expression 13]

$$\frac{\theta_X}{\theta_d} = \frac{\theta_m}{\theta_l} \qquad \text{Expression 13}$$

The following Expression 14 is obtained from Expressions 6, 12, and 13. By erasing $\tau_l$ from Expression 8 using Expression 14, the following Expression 15 is obtained, and by erasing $\tau_d$ from Expression 8 using Expression 14, the following Expression 16 is obtained.

[Mathematical Expression 14]

$$\frac{\tau_d}{\tau_l} = \frac{\theta_d}{\theta_l} \qquad \text{Expression 14}$$

[Mathematical Expression 15]

$$K_{new} = \frac{1}{\frac{d\theta_d}{\tau_l} + \frac{1}{K_{old}}} \frac{\theta_l}{\theta_d} \qquad \text{Expression 15}$$

[Mathematical Expression 16]

$$K_{new} = \frac{1}{\frac{d\theta_d}{\tau_l} + \frac{1}{K_{old}}\frac{\theta_d}{\theta_l}} \qquad \text{Expression 16}$$

In the above-described embodiment, the torque ($\tau_l$) in the end point attitude is obtained from the equation of motion of the articulated robot 1. However, there may be further provided a second measurement unit (second measurement sensor) that measures the torque of the distal end of the articulated robot 1 in the end point attitude. Because the articulated robot 1 is operated in a state where elastic deformation is compensated, such a second measurement sensor measures the torque of the distal end of the articulated robot 1 in the end point attitude when the articulated robot 1 is operated in a state where elastic deformation is compensated. Then, the second measurement sensor outputs the measurement result to the robot controller 10.

The present specification discloses various aspects of techniques as described above, of which the main techniques are summarized below.

A spring constant correction device according to one aspect is a spring constant correction device that is applied to an articulated robot in which a speed reducer acts as a spring element and elastically deforms, the articulated robot being operated in a state where elastic deformation is compensated based on a spring constant of the spring element by an elastic deformation compensation unit included in a robot controller, the spring constant correction device includes: a measurement unit that measures a position and attitude of a distal end of the articulated robot when the articulated robot is operated in a state where the elastic deformation is compensated; a comparison unit that compares measurement values of the position and attitude, of the distal end of the articulated robot, measured by the measurement unit and target values of the position and attitude of the distal end of the articulated robot; and a correction unit that corrects the spring constant based on a result obtained by comparison by the comparison unit, wherein the correction unit corrects, at a predetermined position, the spring constant based on at least three of: an angle of an end point attitude based on the attitude, of the distal end of the articulated robot, measured by the measurement unit; a torque of the distal end of the articulated robot in the end point attitude; an angle of the distal end of the articulated robot in a target attitude; and a torque of the distal end of the articulated robot in the target attitude. Preferably, in the above-described spring constant correction device, the spring constant correction unit obtains the torque in the end point attitude from the equation of motion of the articulated robot. Preferably, in the above-described spring constant correction device, the spring constant correction device further includes a second measurement unit that measures the torque of the distal end of the articulated robot in the end point attitude when the articulated robot is operated in a state where the elastic deformation is compensated.

The spring constant correction device as described above corrects, at a predetermined position, the spring constant based on at least three of: the angle of the end point attitude, based on the attitude of the distal end of the articulated robot, measured by the measurement unit; the torque of the distal end of the articulated robot in the end point attitude; the angle of the distal end of the articulated robot in the target attitude; and the torque of the distal end of the articulated robot in the target attitude. Therefore, the spring constant can be corrected regardless of the difference between the arm torque at the end point position of the weaving motion and the torque required at the target end point position of the weaving motion. Therefore, the spring constant correction device can further improve the correction accuracy.

In another aspect, in the above-described spring constant correction device, the spring constant is expressed by a functional expression, at the predetermined position, based on at least three of: the angle of the end point attitude, based on the attitude of the distal end of the articulated robot, measured by the measurement unit; the torque of the distal end of the articulated robot in the end point attitude; the angle of the distal end of the articulated robot in the target attitude; and the torque of the distal end of the articulated robot in the target attitude, and the correction unit corrects the spring constant using the least-squares method with respect to the functional expression.

Since such a spring constant correction device uses the least-squares method, the functional expression can be customized in accordance with the articulated robot to which the spring constant correction device is applied, and the spring constant can be corrected with optimum correction accuracy for the articulated robot.

In another aspect, in the above-described spring constant correction devices, the predetermined position is an end point position of a weaving motion, and the spring constant is expressed, at the predetermined position, by a functional expression using the torque of the distal end of the articulated robot in the end point attitude, the angle of the distal end of the articulated robot in the target attitude, and the torque of the distal end of the articulated robot in the target attitude. Preferably, in the above-described spring constant correction device, the functional expression is Expression 8. This can provide the spring constant correction device using the functional expression of one aspect.

In another aspect, in the above-described spring constant correction devices, the predetermined position is an end point position of a weaving motion, and the spring constant is expressed, at the predetermined position, by a functional expression using the angle of the end point attitude based on the attitude, of the distal end of the articulated robot, measured by the measurement unit, the angle of the distal end of the articulated robot in the target attitude, and the torque of the distal end of the articulated robot in the target attitude. Preferably, in the above-described spring constant correction device, the functional expression is Expression 15. This can provide the spring constant correction device using the functional expression of another aspect.

In another aspect, in the above-described spring constant correction devices, the predetermined position is an end point position of a weaving motion, and the spring constant is expressed, at the predetermined position, by a functional expression using the angle of the end point attitude based on the attitude, of the distal end of the articulated robot, measured by the measurement unit, the torque of the distal end of the articulated robot in the end point attitude, and the angle of the distal end of the articulated robot in the target attitude. Preferably, in the above-described spring constant correction device, the functional expression is Expression 16. This can provide the spring constant correction device using the functional expression of another aspect.

A spring constant correction method according to another aspect is a spring constant correction method that is applied to an articulated robot in which a speed reducer acts as a spring element and elastically deforms, the articulated robot being operated in a state where elastic deformation is compensated based on a spring constant of the spring element by an elastic deformation compensation unit included in a robot controller, the spring constant correction method including: a measuring step of measuring a position and attitude of a distal end of the articulated robot when the articulated robot is operated in a state where the elastic deformation is compensated; a comparing step of comparing measurement values of the position and attitude, of the distal end of the articulated robot, measured in the [first] measuring step and target values of the position and attitude of the distal end of the articulated robot; and a correcting step of correcting the spring constant based on a result obtained by comparison in the comparing step, wherein in the correcting step, the spring constant is corrected, at a predetermined position, based on at least three of: an angle of an end point attitude based on the attitude, of the distal end of the articulated robot, measured in the measuring step; a torque of the distal end of the articulated robot in the end point attitude; an angle of the distal end of the articulated robot in a target attitude; and a torque of the distal end of the articulated robot in the target attitude.

A spring constant correction program according to another aspect is a spring constant correction program that is applied to an articulated robot in which a speed reducer acts as a spring element and elastically deforms and that is executed by a computer, the articulated robot being operated in a state where elastic deformation is compensated based on a spring constant of the spring element by an elastic deformation compensation unit included in a robot controller, the spring constant correction program including: a measuring step of measuring a position and attitude of a distal end of the articulated robot when the articulated robot is operated in a state where the elastic deformation is compensated; a comparing step of comparing measurement values of the position and attitude, of the distal end of the articulated robot, measured in the measuring step and target values of the position and attitude of the distal end of the articulated robot; and a correcting step of correcting the spring constant based on a result obtained by comparison in the comparing step, wherein in the correcting step, the spring constant is corrected, at a predetermined position, based on at least three of: an angle of an end point attitude based on the attitude, of the distal end of the articulated robot, measured in the measuring step; a torque of the distal end of the articulated robot in the end point attitude; an angle of the distal end of the articulated robot in a target attitude; and a torque of the distal end of the articulated robot in the target attitude.

The spring constant correction method and the spring constant correction program as described above correct, at a predetermined position, the spring constant based on at least three of: the angle of the end point attitude based on the attitude, of the distal end of the articulated robot, measured in the measuring; the torque of the distal end of the articulated robot in the end point attitude; the angle of the distal end of the articulated robot in the target attitude; and the torque of the distal end of the articulated robot in the target attitude. Therefore, the spring constant can be corrected regardless of the difference between the arm torque at the end point position of the weaving motion and the torque required at the target end point position of the weaving motion. Therefore, the spring constant correction method and the spring constant correction program can further improve the correction accuracy.

A recording medium according to another aspect records the above-described spring constant correction program. This can provide a recording medium in which the above-described spring constant correction program is recorded.

The present application is based on Japanese Patent Application No. 2021-024925 filed on Feb. 19, 2021, the contents of which are incorporated herein.

Although the present invention has been appropriately and sufficiently described through the embodiments with reference to the drawings in the foregoing to express the present invention, it should be recognized that a person skilled in the art can easily change and/or improve the above-described embodiment. Therefore, unless a change or improvement made by a person skilled in the art is at a level departing from the scope of rights of the claims described in claims, the change or improvement is interpreted to be included in the scope of rights of the claims.

INDUSTRIAL APPLICABILITY

The present invention can provide a spring constant correction device, a method thereof, and a recording medium.

The invention claimed is:

1. A spring constant correction device applied to an articulated robot in which a speed reducer acts as a spring element and elastically deforms, the articulated robot being operated in a state where elastic deformation is compensated based on a spring constant of the spring element by an elastic deformation compensation unit included in a robot controller, the spring constant correction device comprising:
a measurement unit that measures a position and attitude of a distal end of the articulated robot when the articulated robot is operated in a state where the elastic deformation is compensated;

a comparison unit that compares measurement values of the position and attitude, of the distal end of the articulated robot, measured by the measurement unit and target values of the position and attitude of the distal end of the articulated robot; and a correction unit that corrects the spring constant, based on a result obtained by comparison by the comparison unit, wherein the correction unit corrects, at a predetermined position, the spring constant based on at least three of: an angle of an end point attitude based on the attitude, of the distal end of the articulated robot, measured by the measurement unit; a torque of the distal end of the articulated robot in the end point attitude; an angle of the distal end of the articulated robot in a target attitude; and a torque of the distal end of the articulated robot in the target attitude, the predetermined position is an end point position of a weaving motion, and the spring constant is expressed, at the predetermined position, by a functional expression using the torque $\tau_1$ of the distal end of the articulated robot in the end point attitude, the angle $\theta_d$ of the distal end of the articulated robot in a target attitude, and the torque $\tau_d$ of the distal end of the articulated robot in the target attitude, the functional expression being:

$$K_{new} = \frac{\tau_l}{(\theta_l - \theta_d) + \frac{\tau_d}{K_{old}}} = \frac{\tau_l}{d\theta_d + \frac{\tau_d}{K_{old}}}$$

where $K_{new}$ denotes a corrected spring constant, $K_{old}$ denotes a current spring constant, and $d\theta_d$ denotes an angular error.

2. The spring constant correction device according to claim 1, wherein
the correction unit corrects the spring constant using a least-squares method with respect to the functional expression.

3. A spring constant correction device applied to an articulated robot in which a speed reducer acts as a spring element and elastically deforms, the articulated robot being operated in a state where elastic deformation is compensated based on a spring constant of the spring element by an elastic deformation compensation unit included in a robot controller, the spring constant correction device comprising:

a measurement unit that measures a position and attitude of a distal end of the articulated robot when the articulated robot is operated in a state where the elastic deformation is compensated;

a comparison unit that compares measurement values of the position and attitude, of the distal end of the articulated robot, measured by the measurement unit and target values of the position and attitude of the distal end of the articulated robot; and a correction unit that corrects the spring constant, based on a result obtained by comparison by the comparison unit, wherein the correction unit corrects, at a predetermined position, the spring constant based on at least three of: an angle of an end point attitude based on the attitude, of the distal end of the articulated robot, measured by the measurement unit; a torque of the distal end of the articulated robot in the end point attitude; an angle of the distal end of the articulated robot in a target attitude; and a torque of the distal end of the articulated robot in the target attitude, the predetermined position is an end point position of a weaving motion, and the spring constant is expressed, at the predetermined position, by a functional expression using the angle $\theta_1$ of the end point attitude based on the attitude, of the distal end of the articulated robot, measured by the measurement unit, the angle $\theta_d$ of the distal end of the articulated robot in the target attitude, and the torque $\tau_d$ of the distal end of the articulated robot in the target attitude, the functional expression being:

$$K_{new} = \frac{1}{\frac{d\theta_d}{\tau_d} + \frac{1}{K_{old}}} \frac{\theta_l}{\theta_d}$$

where $K_{new}$ denotes a corrected spring constant, $K_{old}$ denotes a current spring constant, and $d\theta_d$ denotes an angular error.

4. A spring constant correction device applied to an articulated robot in which a speed reducer acts as a spring element and elastically deforms, the articulated robot being operated in a state where elastic deformation is compensated based on a spring constant of the spring element by an elastic deformation compensation unit included in a robot controller, the spring constant correction device comprising:

a measurement unit that measures a position and attitude of a distal end of the articulated robot when the articulated robot is operated in a state where the elastic deformation is compensated;

a comparison unit that compares measurement values of the position and attitude, of the distal end of the articulated robot, measured by the measurement unit and target values of the position and attitude of the distal end of the articulated robot; and a correction unit that corrects the spring constant, based on a result obtained by comparison by the comparison unit, wherein the correction unit corrects, at a predetermined position, the spring constant based on at least three of: an angle of an end point attitude based on the attitude, of the distal end of the articulated robot, measured by the measurement unit; a torque of the distal end of the articulated robot in the end point attitude; an angle of the distal end of the articulated robot in a target attitude; and a torque of the distal end of the articulated robot in the target attitude, the predetermined position is an end point position of a weaving motion, and the spring constant is expressed, at the predetermined position, by a functional expression using the angle $\theta_1$ of the end point attitude based on the attitude, of the distal end of the articulated robot, measured by the measurement unit, the torque $\tau_1$ of the distal end of the articulated robot in the end point attitude, and the angle $\theta_d$ of the distal end of the articulated robot in the target attitude, the functional expression being:

$$K_{new} = \frac{1}{\frac{d\theta_d}{\tau_d} + \frac{1}{K_{old}} \frac{\theta_d}{\theta_l}}$$

where $K_{new}$ denotes a corrected spring constant, $K_{old}$ denotes a current spring constant, and $d\theta_d$ denotes an angular error.

5. A spring constant correction method applied to an articulated robot in which a speed reducer acts as a spring element and elastically deforms, the articulated robot being operated in a state where elastic deformation is compensated based on a spring constant of the spring element by an elastic deformation compensation unit included in a robot controller, the spring constant correction method comprising:

a measuring step of measuring a position and attitude of a distal end of the articulated robot when the articulated robot is operated in a state where the elastic deformation is compensated;

a comparing step of comparing measurement values of the position and attitude, of the distal end of the articulated robot, measured in the measuring step and target values of the position and attitude of the distal end of the articulated robot; and a correcting step of correcting the spring constant, based on a result obtained by comparison in the comparing step, wherein in the correcting step, the spring constant is corrected, at a predetermined position, based on at least three of: an angle of an end point attitude based on the attitude, of the distal end of the articulated robot, measured in the measuring step; a torque of the distal end of the articulated robot in the end point attitude; an angle of the distal end of the articulated robot in a target attitude; and a torque of the distal end of the articulated robot in the target attitude, the predetermined position is an end point position of a weaving motion, and the spring constant is expressed, at the predetermined position, by a functional expression using the torque $\tau_l$ of the distal end of the articulated robot in the end point attitude, the angle $\theta_d$ of the distal end of the articulated robot in a target attitude, and the torque $\tau_d$ of the distal end of the articulated robot in the target attitude, the functional expression being:

$$K_{new} = \frac{\tau_l}{(\theta_l - \theta_d) + \frac{\tau_d}{K_{old}}} = \frac{\tau_l}{d\theta_d + \frac{\tau_d}{K_{old}}}$$

where $K_{new}$ denotes a corrected spring constant, $K_{old}$ denotes a current spring constant, and $d\theta_d$ denotes an angular error.

6. A non-transitory computer-readable medium storing computer readable instructions thereon that are applied to an articulated robot in which a speed reducer acts as a spring element and elastically deforms, the articulated robot being operated in a state where elastic deformation is compensated based on a spring constant of the spring element by an elastic deformation compensation unit included in a robot controller, the computer readable instructions, when executed by a computer, cause the computer to perform a method comprising:

a measuring step of measuring a position and attitude of a distal end of the articulated robot when the articulated robot is operated in a state where the elastic deformation is compensated;

a comparing step of comparing measurement values of the position and attitude, of the distal end of the articulated robot, measured in the measuring step and target values of the position and attitude of the distal end of the articulated robot; and a correcting step of correcting the spring constant, based on a result obtained by comparison in the comparing step, wherein in the correcting step, the spring constant is corrected, at a predetermined position, based on at least three of: an angle of an end point attitude based on the attitude, of the distal end of the articulated robot, measured in the measuring step; a torque of the distal end of the articulated robot in the end point attitude; an angle of the distal end of the articulated robot in a target attitude; and a torque of the distal end of the articulated robot in the target attitude, the predetermined position is an end point position of a weaving motion, and the spring constant is expressed, at the predetermined position, by a functional expression using the torque $\tau_l$ of the distal end of the articulated robot in the end point attitude, the angle $\theta_d$ of the distal end of the articulated robot in a target attitude, and the torque $\tau_d$ of the distal end of the articulated robot in the target attitude, the functional expression being:

$$K_{new} = \frac{\tau_l}{(\theta_l - \theta_d) + \frac{\tau_d}{K_{old}}} = \frac{\tau_l}{d\theta_d + \frac{\tau_d}{K_{old}}}$$

where $K_{new}$ denotes a corrected spring constant, $K_{old}$ denotes a current spring constant, and $d\theta_d$ denotes an angular error.

7. The spring constant correction device according to claim 3, wherein the correction unit corrects the spring constant using a least-squares method with respect to the functional expression.

8. The spring constant correction device according to claim 4, wherein the correction unit corrects the spring constant using a least-squares method with respect to the functional expression.

9. A spring constant correction method applied to an articulated robot in which a speed reducer acts as a spring element and elastically deforms, the articulated robot being operated in a state where elastic deformation is compensated based on a spring constant of the spring element by an elastic deformation compensation unit included in a robot controller, the spring constant correction method comprising:

a measuring step of measuring a position and attitude of a distal end of the articulated robot when the articulated robot is operated in a state where the elastic deformation is compensated;

a comparing step of comparing measurement values of the position and attitude, of the distal end of the articulated robot, measured in the measuring step and target values of the position and attitude of the distal end of the articulated robot; and a correcting step of correcting the spring constant, based on a result obtained by comparison in the comparing step, wherein in the correcting step, the spring constant is corrected, at a predetermined position, based on at least three of: an angle of an end point attitude based on the attitude, of the distal end of the articulated robot, measured in the measuring step; a torque of the distal end of the articulated robot in the end point attitude; an angle of the distal end of the articulated robot in a target attitude; and a torque of the distal end of the articulated robot in the target attitude, the predetermined position is an end point position of a weaving motion, and the spring constant is expressed, at the predetermined position, by a functional expression using the angle $\theta_1$ of the end point attitude based on the attitude, of the distal end of the articulated robot, measured in the measuring step, the angle $\theta_d$ of the distal end of the articulated robot in the target attitude, and the torque $\tau_d$ of the distal end of the articulated robot in the target attitude, the functional expression being:

$$K_{new} = \frac{1}{\frac{d\theta_d}{\tau_d} + \frac{1}{K_{old}}} \frac{\theta_l}{\theta_d}$$

where $K_{new}$ denotes a corrected spring constant, $K_{old}$ denotes a current spring constant, and $d\theta_d$ denotes an angular error.

10. A non-transitory computer-readable medium storing computer readable instructions thereon that are applied to an articulated robot in which a speed reducer acts as a spring element and elastically deforms, the articulated robot being operated in a state where elastic deformation is compensated based on a spring constant of the spring element by an elastic deformation compensation unit included in a robot controller, the computer readable instructions, when executed by a computer, cause the computer to perform a method comprising:

a measuring step of measuring a position and attitude of a distal end of the articulated robot when the articulated robot is operated in a state where the elastic deformation is compensated;

a comparing step of comparing measurement values of the position and attitude, of the distal end of the articulated robot, measured in the measuring step and target values of the position and attitude of the distal end of the articulated robot; and a correcting step of correcting the spring constant, based on a result obtained by comparison in the comparing step, wherein in the correcting step, the spring constant is corrected, at a predetermined position, based on at least three of: an angle of an end point attitude based on the attitude, of the distal end of the articulated robot, measured in the measuring step; a torque of the distal end of the articulated robot in the end point attitude; an angle of the distal end of the articulated robot in a target attitude; and a torque of the distal end of the articulated robot in the target attitude, the predetermined position is an end point position of a weaving motion, and the spring constant is expressed, at the predetermined position, by a functional expression using the angle $\theta_1$ of the end point attitude based on the attitude, of the distal end of the articulated robot, measured in the measuring step, the angle $\theta_d$ of the distal end of the articulated robot in the target attitude, and the torque $\tau_d$ of the distal end of the articulated robot in the target attitude, the functional expression being:

$$K_{new} = \frac{1}{\frac{d\theta_d}{\tau_d} + \frac{1}{K_{old}}} \frac{\theta_l}{\theta_d}$$

where $K_{new}$ denotes a corrected spring constant, $K_{old}$ denotes a current spring constant, and $d\theta_d$ denotes an angular error.

11. A spring constant correction method applied to an articulated robot in which a speed reducer acts as a spring element and elastically deforms, the articulated robot being operated in a state where elastic deformation is compensated based on a spring constant of the spring element by an elastic deformation compensation unit included in a robot controller, the spring constant correction method comprising:

a measuring step of measuring a position and attitude of a distal end of the articulated robot when the articulated robot is operated in a state where the elastic deformation is compensated;

a comparing step of comparing measurement values of the position and attitude, of the distal end of the articulated robot, measured in the measuring step and target values of the position and attitude of the distal end of the articulated robot; and a correcting step of correcting the spring constant, based on a result obtained by comparison in the comparing step, wherein in the correcting step, the spring constant is corrected, at a predetermined position, based on at least three of: an angle of an end point attitude based on the attitude, of the distal end of the articulated robot, measured in the measuring step; a torque of the distal end of the articulated robot in the end point attitude; an angle of the distal end of the articulated robot in a target attitude; and a torque of the distal end of the articulated robot in the target attitude, the predetermined position is an end point position of a weaving motion, and the spring constant is expressed, at the predetermined position, by a functional expression using the angle $\theta_1$ of the end point attitude based on the attitude, of the distal end of the articulated robot, measured in the measuring step, the torque $\tau i$ of the distal end of the articulated robot in the end point attitude, and the angle $\theta_d$ of the distal end of the articulated robot in the target attitude, the functional expression being:

$$K_{new} = \frac{1}{\frac{d\theta_d}{\tau_d} + \frac{1}{K_{old}} \frac{\theta_d}{\theta_l}}$$

where $K_{new}$ denotes a corrected spring constant, $K_{old}$ denotes a current spring constant, and $d\theta_d$ denotes an angular error.

12. A non-transitory computer-readable medium storing computer readable instructions thereon that are applied to an articulated robot in which a speed reducer acts as a spring element and elastically deforms, the articulated robot being operated in a state where elastic deformation is compensated based on a spring constant of the spring element by an elastic deformation compensation unit included in a robot controller, the computer readable instructions, when executed by a computer, cause the computer to perform a method comprising:

a measuring step of measuring a position and attitude of a distal end of the articulated robot when the articulated robot is operated in a state where the elastic deformation is compensated;

a comparing step of comparing measurement values of the position and attitude, of the distal end of the articulated robot, measured in the measuring step and target values of the position and attitude of the distal end of the articulated robot; and a correcting step of correcting the spring constant, based on a result obtained by comparison in the comparing step, wherein in the correcting step, the spring constant is corrected, at a predetermined position, based on at least three of: an angle of an end point attitude based on the attitude, of the distal end of the articulated robot, measured in the measuring step; a torque of the distal end of the articulated robot in the end point attitude; an angle of the distal end of the articulated robot in a target attitude; and a torque of the distal end of the articulated robot in the target attitude, the predetermined position is an end point position of a weaving motion, and the spring constant is expressed, at the predetermined position, by a functional expression using the angle $\theta_1$ of the end point attitude based on the attitude, of the distal end of the articulated robot, measured in the measuring step, the torque $\tau i$ of the distal end of the articulated robot in the end point attitude, and the angle $\theta_d$ of the distal end of the articulated robot in the target attitude, the functional expression being:

$$K_{new} = \frac{1}{\frac{d\theta_d}{\tau_d} + \frac{1}{K_{old}}\frac{\theta_d}{\theta_l}}$$

where $K_{new}$ denotes a corrected spring constant, $K_{old}$ denotes a current spring constant, and $d\theta_d$ denotes an angular error.

* * * * *